Figure 6:
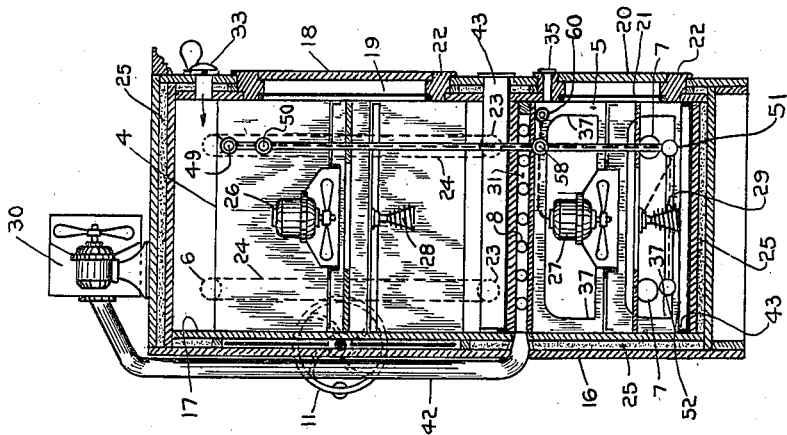

Dec. 2, 1941.    L. A. CLAYTON    2,264,619
INCUBATOR
Filed Sept. 13, 1939    3 Sheets-Sheet 1
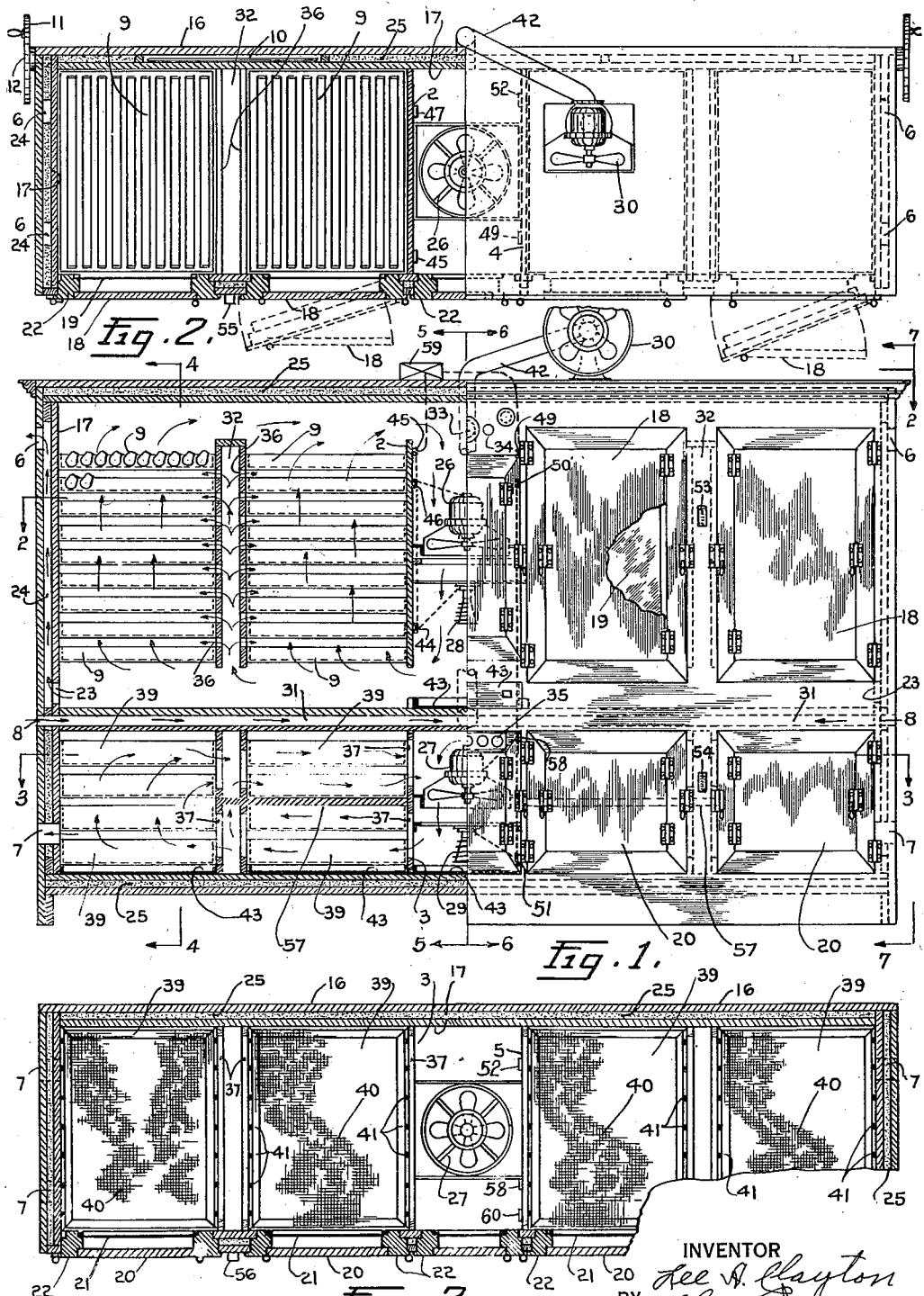

Dec. 2, 1941. L. A. CLAYTON 2,264,619

INCUBATOR

Filed Sept. 13, 1939 3 Sheets-Sheet 2

INVENTOR
Lee A. Clayton
BY
Chas. Denegre
ATTORNEY

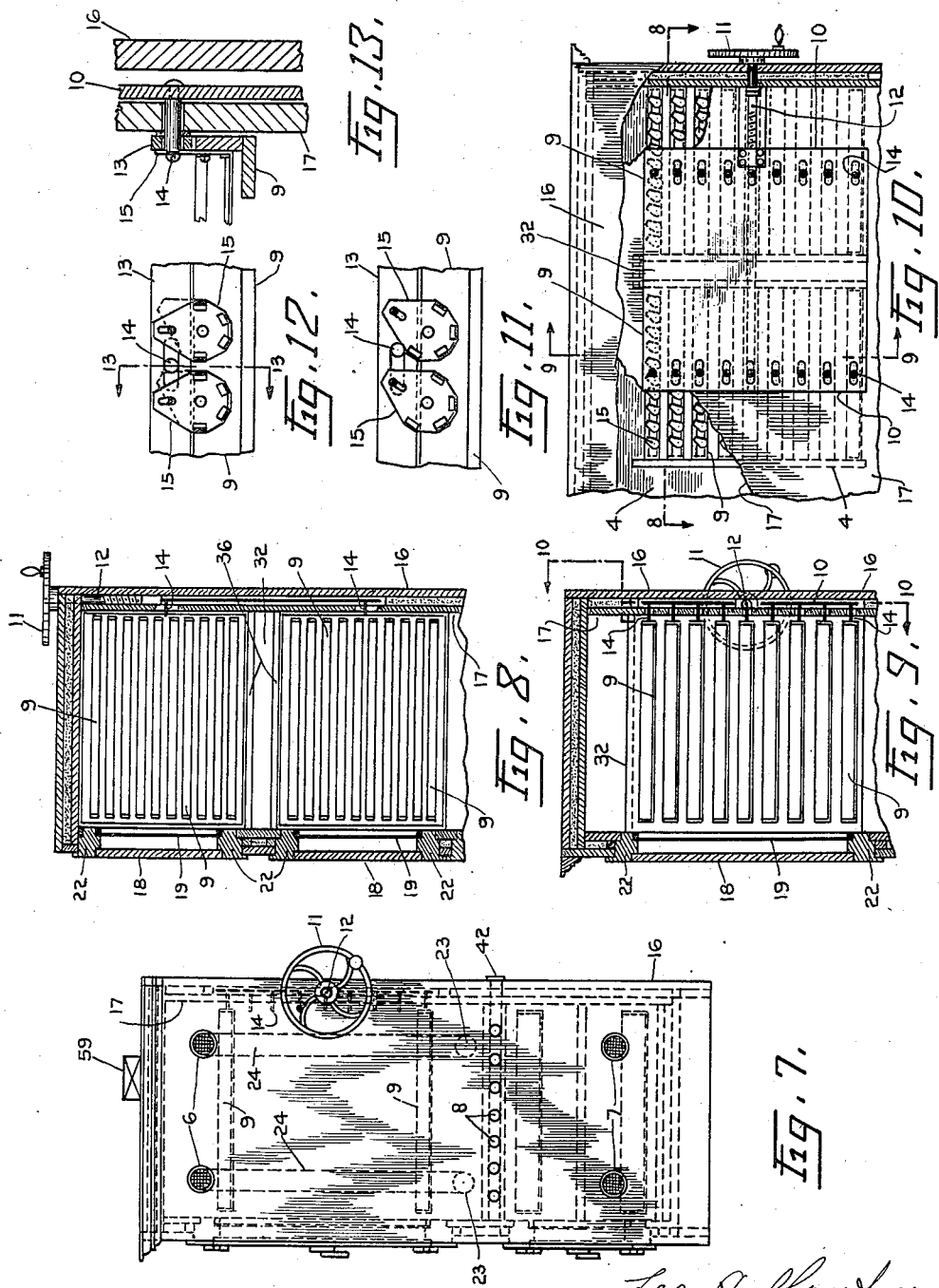

Patented Dec. 2, 1941

2,264,619

UNITED STATES PATENT OFFICE 2,264,619

INCUBATOR

Lee A. Clayton, Birmingham, Ala., assignor of forty-nine per cent to James O. Robinette, Birmingham, Ala.

Application September 13, 1939, Serial No. 294,603

2 Claims. (Cl. 119—37)

This invention relates to an improved apparatus commonly called an incubator for the purpose of hatching eggs, an invention more particularly described as that type of incubator in which the eggs are arranged for different stages of incubation, this consisting in placing the eggs in what is known as a hatching compartment after they have reached the stage where they are to begin to hatch within a few days. The incubator is provided with a system of supplying heated moist air from two sources, each compartment of the incubator being provided with a separate source.

I am aware of the fact that there are many incubators in use, but there are none to my knowledge possessing the advantages of my incubator as will be disclosed.

The incubator is divided into two separate compartments comprising the upper or incubator and the lower or hatching compartment. These compartments are independent one of the other, each containing its own heating and atmospheric control system. The compartments are further divided into three divisions each, a right and left incubator division and a right and left hatching division. In the center in the upper and lower compartments is placed another division containing the heating and circulating members.

Similar reference numerals refer to similar parts throughout the several views.

Figure 5:
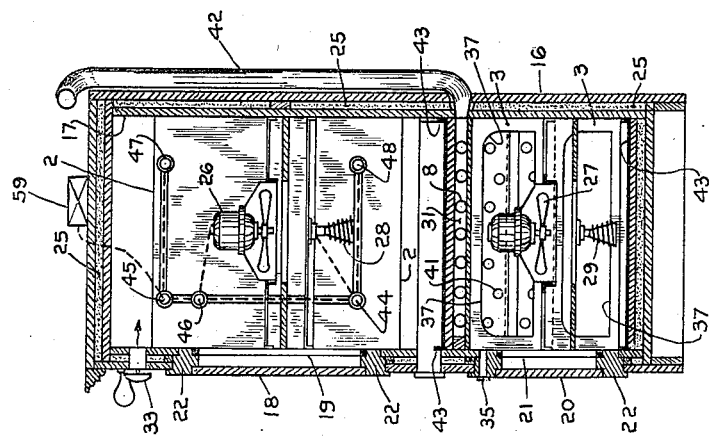
Figure 4:
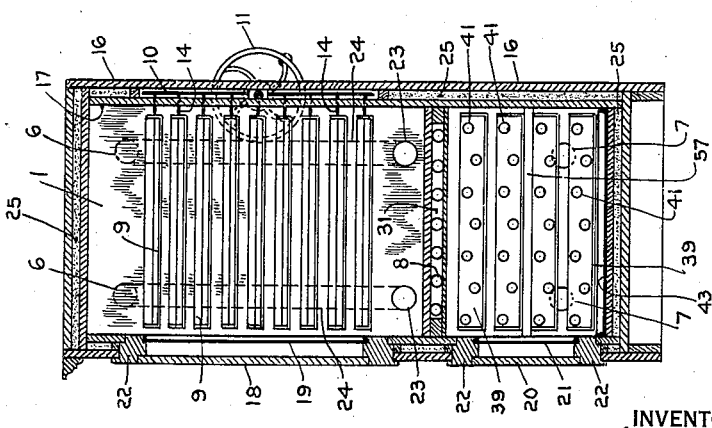

Fig. 1 is a front elevation of whole incubator with the left front wall cut away; Fig. 2 is a plan of top of incubator with left half in section on line 2—2 on Fig. 1; Fig. 3 is a plan of bottom hatchery in section on line 3—3 on Fig. 1 showing trays; Fig. 4 is a view in vertical section on line 4—4 on Fig. 1 showing both incubator and hatchery trays and wall; Fig. 5 is a view in section on line 5—5 on Fig. 1; Fig. 6 is a view in section on line 6—6 on Fig. 1; Fig. 7 is an outside end view on line 7—7 on Fig. 1; Fig. 8 is a part plan in section on line 8—8 on Fig. 10; Fig. 9 is a part elevation in section on line 9—9 on Fig. 10; Fig. 10 is a part rear elevation on line 10—10 on Fig. 9; Fig. 11 is a detail of tray 9 and plate 15; Fig. 12 is a detail of tray 9 and plate 15 with trays in upright position; Fig. 13 is a cross section of Fig. 12 on line 13—13 on Fig. 12.

By referring to the drawings it will be seen the structure of the incubator comprises a main outside case having an outer wall 16, an inner wall 17 and insulation 25 between the walls. About two-thirds down in the case there is a double floor that cuts off the upper compartment from the lower compartment. This floor has a ventilating space 31 between its upper layer and lower layer for the passage of air from the outside through a series of holes indicated by 8 on each side of the incubator. The upper compartment of the incubator is designated as the incubator compartment and the lower compartment is designated as the hatchery compartment. This is for the purpose of removing the eggs to the hatchery compartment when they are near the hatching stage. The trays are manipulated by hand wheel 11 on shaft 12 and slide mechanism 10. The egg trays and operation of same are no part of the present invention as they are now standard in large incubators, but they are here included to show their position with relation to the flow of air in the assembled parts making up the entire machine. In each end of the upper compartment there is an air shaft 24 formed between the inner wall 17 and the outer wall 16 of the incubator. This air shaft has an inlet near the bottom of wall 17 as shown by 23 and an outlet through wall 16 as indicated by 6. There is another air shaft 32 that is formed by partitions running up part of the way between the trays 9. Mounted in the central division just above an horizontal floor with its center portion cut out between partitions 2 and 4 is electric fan 26 that draws air through intake 34 and adjustable intake 33 and forces same downward by heating unit 28 that is suspended from a bracket. On the floor there is a water pan indicated by 43 which the air strikes for moisture purposes. The air then travels along the solid floor up through the egg trays and air shaft 32. The air circulates up through the egg trays and also through holes 36 in shaft 32. When the hot air rises to the top it drifts towards the center and is sucked down by the fan. Surplus air passes out through 23 up air shaft 24 and out exhaust hole 6. There is a switch 45 provided for the incubator compartment. In the incubator compartment 44 indicates the plug for the heating unit and 46 the plug for the fan. Mounted on top of incubator is suction fan 30 attached to pipe 42 that is connected to the air space 31 in the double floor of the incubator for the purpose of drawing cool air through inlet holes 8.

The lower compartment is somewhat similar to the upper compartment except as to the circulation of air. The fresh air is drawn in through adjustable intakes 35 and is forced downward by fan 27 just above an horizontal floor with its center portion cut out passing heating unit 29 that is suspended from a bracket. Partitions 3 and 5 run from the top of the bottom floor to the bottom of the upper floor with holes placed in same. When the stream of air strikes the partitions it travels along the route indicated by 37 and 39. There is a horizontal partition indicated by 57 that extends along a little over one-half the floor in the lower compartment. This is for the purpose of carrying the flow of air towards each outer end of the hatchery divisions. The flow of air travels upwardly back towards the fan and the surplus air passes out through the exhaust 7.

The upper and lower compartments are provided with double doors made of wood and glass. The main body of the doors are attached to sash 22 and have outside wood panels indicated by 18 and 20 to cover the glass panels indicated by 19 and 21. There is a relay switch 47, thermostat 48 for control of the heat in the incubator, a switch 49 for the hatchery and relay switch 50. Also there is a plug 51 for the heating unit in the hatchery; thermostat 52 for control of the heat in the hatchery compartment; wet-bulb thermometer 53 to indicate humidity in the incubator compartment; wet-bulb thermometer 54 to indicate humidity in the hatchery compartment; thermometer 55 for indication of temperature in the incubator; and thermometer 56 for indication of temperature in hatchery compartment. There is a plug 58 for fan in the hatchery compartment; main switch 59 for control of all electric power to the entire incubator; and thermostat 60 for control of electric current to fan 30. The egg trays have screen bottoms indicated by 40 with vent holes in their sides indicated by 41.

1. An incubator compartment divided into three divisions by walls having upper and lower holes for air passage, the central division of said compartment having an electric fan mounted above and close to an electric heating unit, a flat pan for water directly below the heating unit, said fan disposed to force air downwardly when operating, said air striking the surface of water in said flat pan positioned close to and directly below the fan and heating unit, said air passing out of said central division through the holes in the lower portion of its walls, said air passing horizontally along the floors of the lower halves of the adjacent divisions on both sides containing trays holding the eggs, each of said egg-containing divisions having a solid horizontal floor extending from the inner wall to a little over one-half the distance to the outer wall of the division, this floor directing air from the lower holes below this floor, then up, and then inward above this floor to the upper holes; the egg trays having holes in their sides which form passage ways for the air, said air thus going to its starting point and again in contact with the fan for recirculation.

2. An incubator having two stories, the upper story for hatching eggs in the early stage of incubation and the lower story for hatching the same eggs in the final stage of incubation, said two stories divided by a double floor with an air space between its upper and lower layer, vent holes in each end of said air space, a draft pipe attached to the rear of said air space, and an electric fan mounted on top of the incubator and connected to said air pipe for circulating fresh air for cooling the air between said upper and lower floors, said fan being thermostat controlled.

LEE A. CLAYTON.